United States Patent [19]
Kamihara et al.

[11] Patent Number: 5,770,120
[45] Date of Patent: Jun. 23, 1998

[54] METHOD OF MANUFACTURING DIE AND OPTICAL ELEMENT PERFORMED BY USING THE DIE

[75] Inventors: Yasuhiro Kamihara; Hitoshi Ohashi, both of Hachioji, Japan

[73] Assignee: Olympus Optical Co., Ltd., Tokyo, Japan

[21] Appl. No.: 570,508

[22] Filed: Dec. 11, 1995

[30] Foreign Application Priority Data

Dec. 9, 1994 [JP] Japan .................................. 6-306321
Dec. 9, 1994 [JP] Japan .................................. 6-306322

[51] Int. Cl.⁶ ...................................................... B44C 1/22
[52] U.S. Cl. ............................ 264/1.27; 216/24; 216/54; 216/67; 264/1.33; 264/2.5; 264/219; 264/220; 425/174.4; 425/810
[58] Field of Search ................................ 216/24, 26, 54, 216/67; 264/2.5, 1.33, 219, 1.27, 220; 425/174.4, 408, 412, 810

[56] References Cited

U.S. PATENT DOCUMENTS

| | | | |
|---|---|---|---|
| 4,619,804 | 10/1986 | Leonard et al. ......................... | 269/220 |
| 5,008,176 | 4/1991 | Kondo et al. ........................... | 430/272 |
| 5,116,461 | 5/1992 | Lebby et al. ............................ | 156/643 |
| 5,234,537 | 8/1993 | Nagano et al. ......................... | 156/643 |
| 5,238,786 | 8/1993 | Kashiwagi ............................. | 430/321 |
| 5,298,466 | 3/1994 | Brasseur ................................. | 437/228 |
| 5,417,799 | 5/1995 | Daley et al. ............................. | 216/24 |

FOREIGN PATENT DOCUMENTS

| | | |
|---|---|---|
| 4-229211A | 8/1992 | Japan . |
| 5-297210A | 11/1993 | Japan . |
| 7-5318A | 1/1995 | Japan . |

*Primary Examiner*—Jay H. Woo
*Assistant Examiner*—Iurie Schwartz
*Attorney, Agent, or Firm*—Stevens, Davis, Miller & Mosher, L.L.P.

[57] ABSTRACT

A method of manufacturing a die for optical elements having a given construction on a relief type grating or the like is disclosed. The method includes the steps of: forming a workpiece film on a substrate; machining the workpiece film in a required configuration; subjecting the workpiece film machined in the required form and the substrate to etching to transfer the configuration of the workpiece film on the substrate analogously in the depth direction; and forming a die by using the etched substrate as a master matrix.

20 Claims, 11 Drawing Sheets

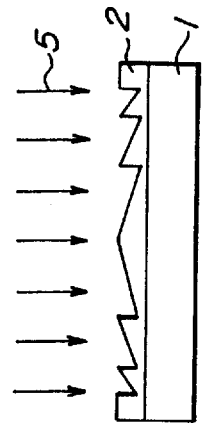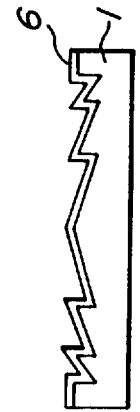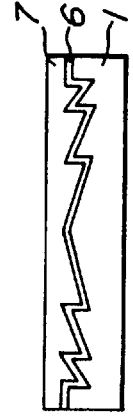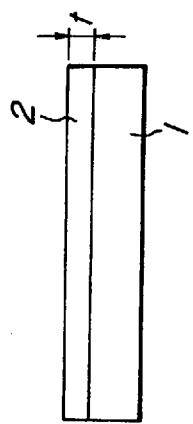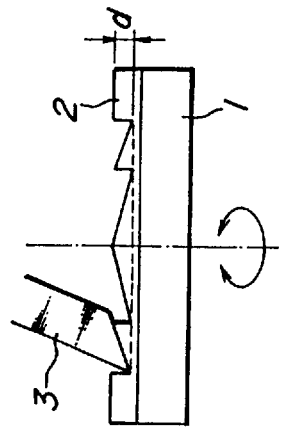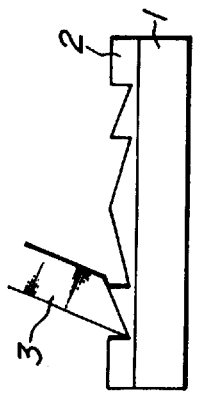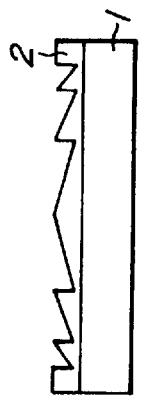

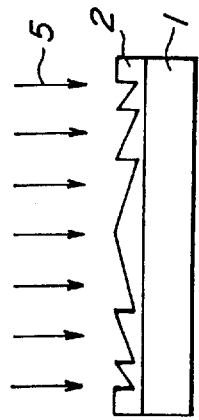
FIG.2a
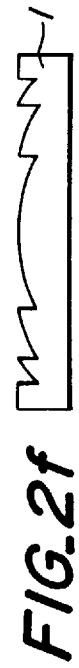
FIG.2b
FIG.2c
FIG.2d
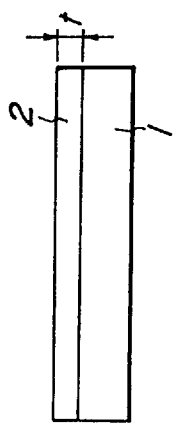
FIG.2e
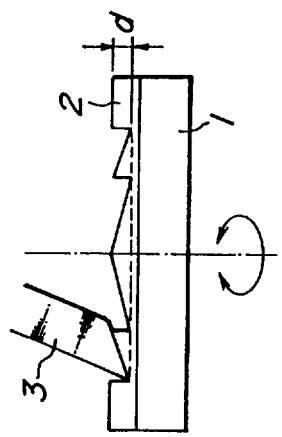
FIG.2f
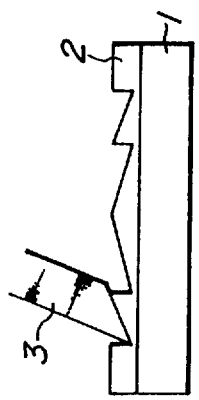
FIG.2g
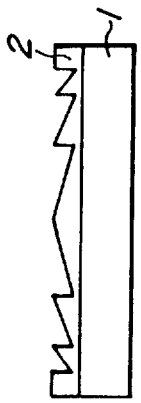
FIG.2h
FIG.2i

FIG_3a
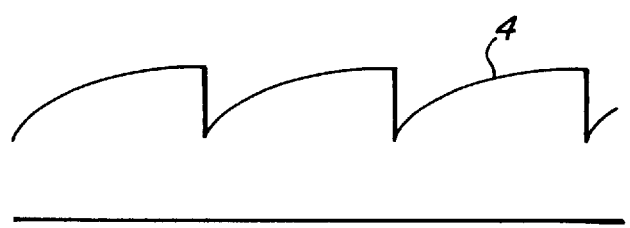
FIG_3b
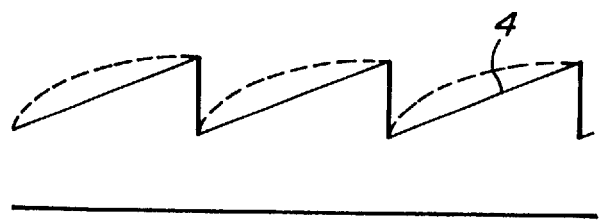

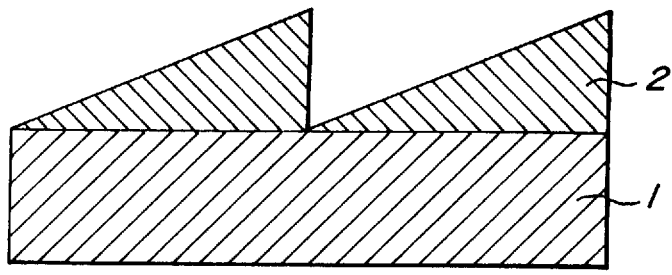
FIG._4a
⬇ Selecting ratio : 1.0
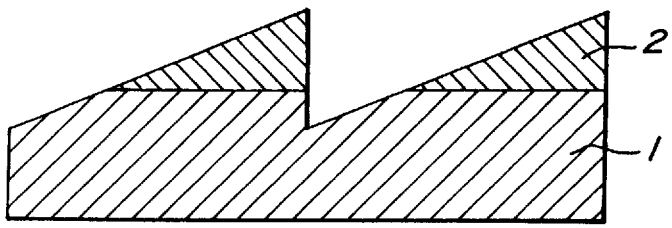
FIG._4b
⬇ Selecting ratio : 0.6
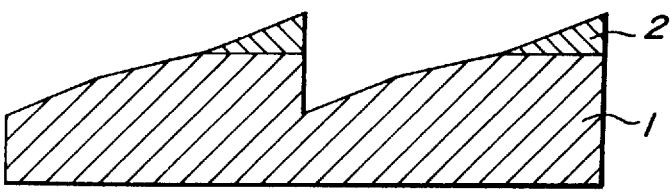
FIG._4c
⬇ Selecting ratio : 0.2
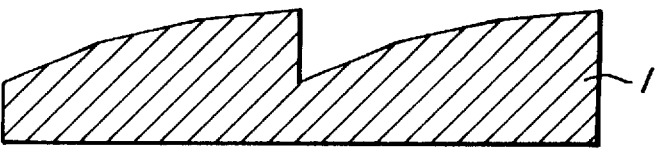
FIG._4d

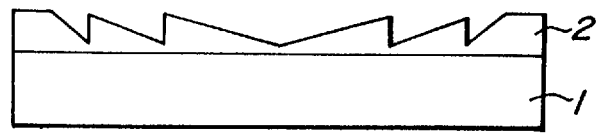
FIG_5a
FIG_5b
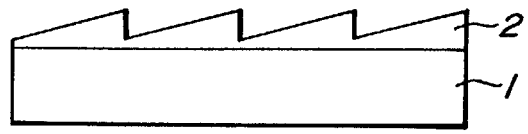
FIG_6a
FIG_6b

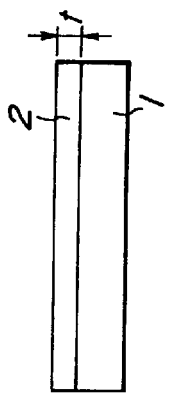 FIG_7a
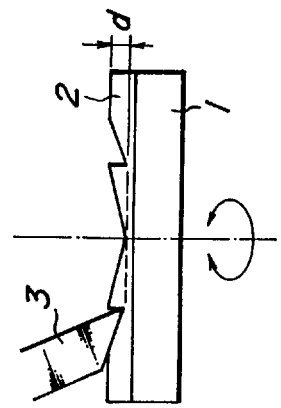 FIG_7b
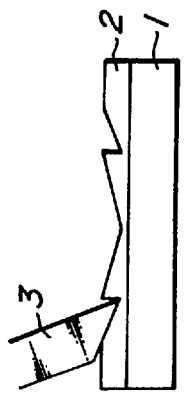 FIG_7c
 FIG_7d
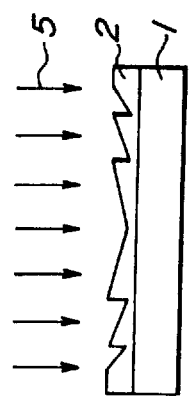 FIG_7e
 FIG_7f
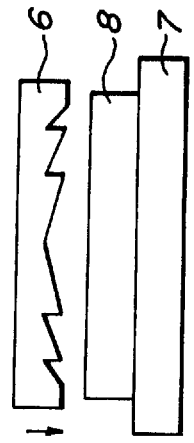 FIG_7g

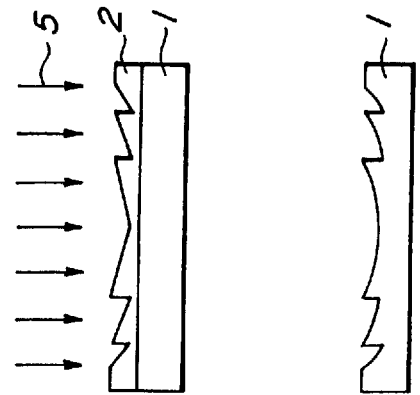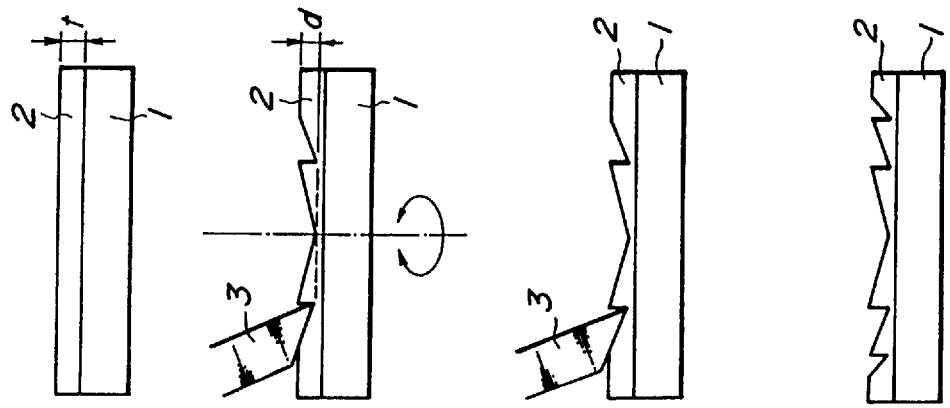

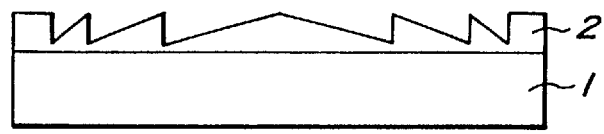
FIG._10a
FIG._10b
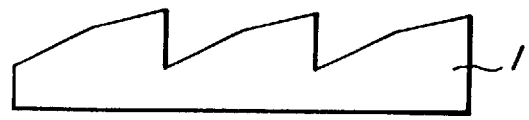
FIG._11a
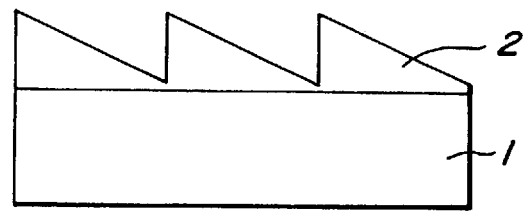
FIG._11b
FIG._11c

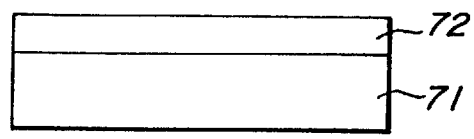
FIG_12a
PRIOR ART
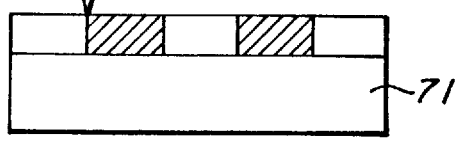
FIG_12b
PRIOR ART
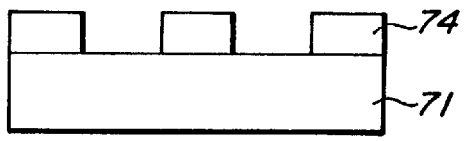
FIG_12c
PRIOR ART
FIG_12d
PRIOR ART
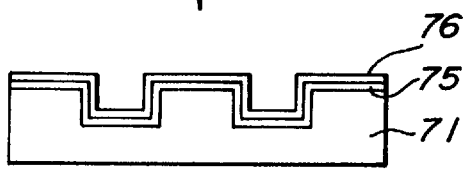
FIG_12e
PRIOR ART
FIG_12f
PRIOR ART

FIG_13a
*PRIOR ART*
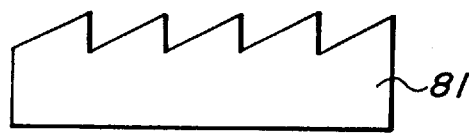
FIG_13b
*PRIOR ART*
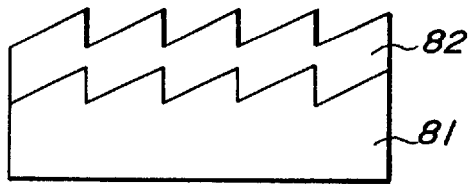
FIG_13c
*PRIOR ART*
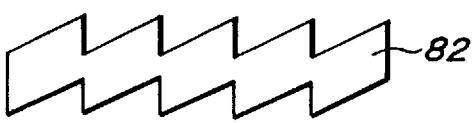
FIG_13d
*PRIOR ART*
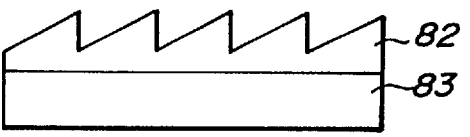
FIG_13e
*PRIOR ART*
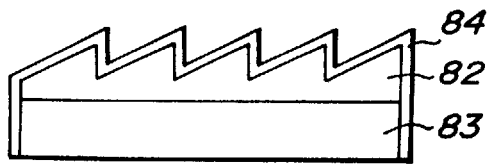

METHOD OF MANUFACTURING DIE AND OPTICAL ELEMENT PERFORMED BY USING THE DIE

BACKGROUND OF THE INVENTION

1. Field of the Invention

The present invention relates to a method of manufacturing a die for an optical element having a given construction on a relief type grating or the like, and a method of manufacturing an optical element performed by using the die.

2. Related Art Statement

Recently, according to a request for making an optical system high performance and downsized, diffraction optical element and a Fresnel lens have been noted. In the case of diffraction optical elements having relief type grating construction, if the shape of sectional configuration of the grating groove is blazed, high diffraction efficiency can be obtained.

In Japanese Patent Application Laid open No. 331,153/93 (Japanese Patent Application Laid Open No. 5,318/95) which corresponds to U.S. patent application Ser. No. 08/229,664, filed Apr. 19, 1994, a given configuration is formed on a workpiece film with a machining and, this configuration is transferred to a substrate by anisotropic etching, thereby manufacturing an optical element of blazed configuration. According to this method, since the workpiece film is cut by a numerically controlled cutting machine, a given configuration can easily be formed as compared with the method due to exposure and development, so that the diffraction optical element can be manufactured precisely. Moreover, the configuration of the workpiece film is transferred to the substrate, so that the optical element can be formed regardless of workability of the substrate.

However, in this method, the machining step and the erosion step are required for each optical element, so that mass productivity becomes worse.

In order to utilize these optical elements practically, it is necessary to decrease manufacturing cost per one optical element. Then, it is considered that these optical elements are manufactured by a die used for common optical lens. However, hardness of die materials, particularly die materials used for a press molding of glass, is very high, so that it is difficult to form the optical element having fine configuration, such as blazed grating. Therefore, as shown hereinafter, a method of utilizing a die, in which a master matrix is fabricated, and its configuration is inversely transferred, is proposed in Japanese Patent Application Laid open Nos. 229,211/92 and 297,210/93.

This method described in Japanese Patent Application Laid open No. 229,211/92 relates to a method of manufacturing a stamper for the optical disk, and discloses a mass production of the optical element and an optical disk by considering the mass productivity, but this method can also be applied to a manufacture of a diffraction grating.

That is, as shown in FIG. 12a, a photoresist 72 is applied onto a glass substrate 71, and developed after cutting it with laser beam 73 as shown in FIG. 12b, thereby forming an given uneven photoresist pattern 74 as shown in FIG. 12c. Next, the glass substrate 71 is subjected to etching by using the uneven pattern 74 as a mask as shown in FIG. 12d, and then a tantalum film 75 and a nickel film 76 are provided on the etched glass substrate 71 as shown in FIG. 12e, and a nickel passivated film is formed on the surface of nickel film. Thereafter, the whole substrate is subjected to an electroforming process to form a nickel electroforming layer 77 as shown in FIG. 12f and then the nickel electroforming layer 77 is removed from the surface of the substrate 71, thereby forming a master for the diffraction grating.

The method described in Japanese Patent Application Laid open No. 297,210/93 is another method of mass-producing an optical element or the like with the use of the die. In this method, as shown in FIG. 13a, previously cut diffraction grating master 81 with high precision is prepared and after a film 82 is formed on a surface thereof as shown in FIG. 13b, only the film 82 for which the transformed configuration of the diffraction grating is duplicated, as shown in FIG. 13c, is removed from the diffraction grating master 81. The rear surface of the film 82 is polished as a plane surface as shown in FIG. 13d and then is adhesive to the surface of a preform 83 through a bonding layer. Then, as shown in FIG. 13e, platinum based alloy 84 is formed on the film 82 as a guard layer, thereby forming a diffraction grating with the use of the alloy guard layer 84 as a die.

In the above method described in Japanese Patent Application Laid open No. 229,211/92, so called, an electroforming method is used, and nickel is utilized as a die material. In this case, the material of optical element is substantially limited to plastics, so that it is difficult to manufacture the glass optical element. In this method, moreover, since the die is used, mass production is preferable, but this method considers only the uneven pattern having rectangular cross-section, so that if this method is applied to the manufacture of the diffraction grating, it is difficult to obtain high diffraction efficiency.

In the method described in Japanese Patent Application Laid open No. 297,210/93, furthermore, the die for glass press molding can be manufactured, but its manufacturing steps become long and complicated.

In the method described in Japanese Patent Application Laid open No. 297,210/93, moreover, as the method of manufacturing the diffraction grating master, a ruling engine is used. Generally, this ruling engine can only rule a linear grating, so that a master of diffraction lens having a ring pattern can not be manufactured. Generally, it is difficult to manufacture a blazed diffraction lens having a ring pattern and, this method is also not described in Japanese Patent Application Laid open No. 297,210/93.

SUMMARY OF THE INVENTION

It is an object of the present invention to resolve the above described problems of the methods of manufacturing a die for an optical elements having a given configuration like a relief type grating or the like, and the methods of manufacturing optical elements performed by using the die.

It is another object of the present invention to provide a method of manufacturing a die for optical elements having a given configuration like a relief type grating or the like, in which the die for manufacturing the optical elements having blazed configuration is precisely manufactured with simple steps.

It is a further object of the present invention to provide a method of manufacturing optical elements performed by using such a die, in which the optical elements having high diffraction efficiency and high beam-collecting efficiency can be manufactured precisely with mass production.

According to a first aspect of the present invention, there is provided a method of manufacturing a die for optical elements having a given construction like a relief type grating or the like, comprising steps of: forming a workpiece film on a substrate; machining the workpiece film in a required configuration; subjecting the workpiece film machined in the required configuration and the substrate to etching to transfer the configuration of the workpiece film on the substrate analogously in the depth direction; and forming a die by using the etched substrate as a master matrix, in which step the inverted configuration of the master matrix, that is, the inverted configuration of the optical elements to be manufactured, is formed on a surface of the die.

According to a second aspect of the present invention, a method of manufacturing a die for optical elements having a given configuration like a relief type grating or the like, comprises steps of: forming a workpiece film on a surface of a substrate; machining the workpiece film in a required configuration; subjecting the workpiece film machined in the required form and the substrate to an anisotropic etching process while changing a selection ratio of an etching rate of a substrate to an etching rate of the workpiece film; and forming a die by using the anisotropically etched substrate as a master matrix, thereby transferring the configuration of the workpiece film to the surface of the substrate with the transferred configuration being modified. This selection ratio is defined to as a ratio of an etching rate of the substrate to an etching rate of the workpiece film. In the etching process above, by changing the selection ratio, a modified configuration corresponding to the configuration of the workpiece can be formed on the surface of the substrate. The substrate thus formed is used as a master matrix to form the die, so that the die having a cross sectional configuration different from the inversed configuration of the workpiece film machined thereon can be formed.

Moreover, if the anisotropic etching is performed by changing the selection ratio continuously, the configuration of the workpiece film having a linearly machined cross section can be transferred to the surface of the substrate as a curved configuration. This means that upon manufacturing a die for diffraction gratings or Fresnel lenses, if it is necessary to machine the cross section in a ideal configuration, generally, a curved configuration, the workpiece film may be machined in a linear configuration, and thus, the machine process can be performed with simple cutting data and with short time.

Alternatively, if the selection ratio is changed in a stepwise manner, the configuration of the workpiece film having a linearly machined cross section can be transferred to the surface of the substrate as a configuration bent by the number of the selection ratio changing steps. This can be applied to the case that a die for the blazed diffraction gratings is formed for two wavelengths having the configuration bent by one time as a cross section.

In this case, the machining does not have to be performed two times for one grating groove unlike in the conventional method, the workpiece film is provided with a grating having a linear cross section, so that machining data can be simple and the machining time can considerably be reduced.

In the etching process above, the anisotropic etching is an etching using reactive gas plasma, and the means of changing the selection ratio is at least one of the following means of: changing gas composition in the plasma; changing discharge power flux density; changing pressure of discharge gas; and changing frequency of applied voltage.

In this connection, when an etching utilizing reactive gas plasma is used as the anisotropic etching method and the composition of gases in the plasma or the discharge power flux density is varied for changing the selection ratio, there occur changes in kinds and proportion of reactants and neutral reactants as well as in the energy of ions. This leads to changes in the reaction on the surface and in the reaction rate, thereby changing the selection ratio. When the pressure of the discharge gas or the frequency of the applied voltage is varied for the purpose of varying the selection ratio, the energy of ions and average energy of electrons are varied, thereby accomplishing the purpose of changing the selection ratio.

If the selection ratio is changed in the course of the anisotropic etching, the configuration of the workpiece film is transferred to the substrate with some modification. The etching using the reactive gas plasma is superior in anisotropy so that the configuration in the plain direction is transferred to the substrate with fidelity. This substrate is used as a master matrix to form the die, so that the die having a precise configuration in the plain direction and a controlled configuration in the depth direction can be manufactured.

After a master matrix is manufactured as explained above, a process of forming a die includes, for example, steps of: forming an electrode member of conductive metal on the master matrix; forming an electroformed layer by performing an electroforming process using the electrode member as an electrode; and removing the electroformed layer from the master matrix. Through these steps, the inverted configuration of the configuration of the master matrix is precisely formed on the electroforming layer.

According to a third aspect of the present invention, a method of manufacturing optical elements comprising steps of: forming a workpiece film on a substrate; machining the workpiece film in a required configuration; subjecting the workpiece film machined in the required form and the substrate to etching to transfer the configuration of the workpiece film on the substrate analogously in the depth direction; forming a die by using the etched substrate as a master matrix, in which step the inverted configuration if the master matrix, that is, the inverted configuration of the optical elements to be manufactured, is formed on a surface of the die; and fabricating optical elements with the use of the thus formed die.

According to a fourth aspect of the present invention, a method of manufacturing optical elements comprises steps of: forming a workpiece film on a substrate; machining the workpiece film in a required configuration; subjecting the workpiece film machined in the required configuration and the substrate to an anisotropic etching process while changing a selection ratio of an etching rate of the substrate to an etching rate of the workpiece film; forming a die by using the anisotropically etched substrate as a master matrix, and fabricating optical elements with the use of the thus formed die.

After a master matrix is manufactured as explained above, a process of manufacturing optical elements includes, for example, steps of: forming an electrode member of conductive metal on the master; forming an electroformed layer by performing an electroforming process using the electrode member as an electrode; elements having a precisely duplicated configuration of the master matrix are manufactured.

According to the fifth aspect of the method of the present invention, there is described a method of manufacturing a die for optical elements each having a given construction like a relief type grating or the like, comprising steps of: forming a workpiece film on a substrate; machining the workpiece film in a required configuration; subjecting the workpiece film machined in the required configuration and the substrate to etching to transfer the configuration of the workpiece film on the substrate analogously in the depth direction; and forming a die by directly using the thus etched substrate as a part of the die.

According to the sixth aspect of the method of the present invention, the method of manufacturing a die for optical elements having a given construction like a relief type grating or the like, comprises steps of: forming a workpiece film on a substrate; machining the workpiece film in a required configuration; subjecting the workpiece film machined in the required configuration and the substrate to an anisotropic etching process while changing a selection ratio of an etching rate of the substrate to an etching rate of the workpiece film; and forming a die by using the thus anisotropically etched substrate as a part of the die.

In the etching process above, by changing the selection ratio, a modified configuration corresponding to the configuration of the workpiece can be formed on the surface of the substrate. The substrate thus formed is used as a part of the die, so that the die having a cross sectional configuration different from the inversed configuration of the workpiece film machined thereon can be formed.

According to the seventh aspect of the method of the present invention, a method of manufacturing optical elements comprises steps of: forming a workpiece film on a substrate; machining the workpiece film in a required configuration; subjecting the workpiece film machined in the required configuration and the substrate to etching to transfer the configuration of the workpiece film on the substrate analogously in the depth direction; and fabricating optical elements with the use of the thus formed substrate as a part of a die.

According to the eighth aspect of the method of the present invention, a method of manufacturing optical elements comprises steps of: forming a workpiece film on a substrate; machining the workpiece film in a required configuration; subjecting the workpiece film machined in the required configuration and the substrate to an anisotropic etching process while changing a selection ratio of the etching rate of the substrate to the etching rate of the workpiece film; and fabricating optical elements with the use of the thus formed substrate as a part of a die.

According to the fifth, sixth, seventh and eighth aspects of the invention, the thus formed substrate is used as at least a part of the die to manufacture optical elements, so that optical elements having an inverted configuration of the configuration formed in the substrate can be manufactured by means of, for example, press or injection molding.

BRIEF DESCRIPTION OF THE DRAWINGS

FIGS. 1a–1i are cross-sectional views showing manufacturing steps of first embodiment of a method of manufacturing a die for optical elements each having a given configuration on a relief type grating according to the present invention;

FIGS. 2a–2i are cross-sectional views showing manufacturing steps of second embodiment of the method of manufacturing a die for optical elements each having a given configuration on a relief type grating according to the present invention;

FIGS. 3a and 3b are cross-sectional views showing configuration of a workpiece film for use in the method shown in FIG. 2;

FIGS. 4a–4d are cross-sectional views explaining a principle of anisotropic etching steps performed while changing a selection ratio of an etching rate of a substrate to an etching rate of the workpiece film;

FIGS. 5a and 5b are cross-sectional views showing configuration of a workpiece film for use in the method of the second embodiment shown in. FIG. 2;

FIGS. 6a and 6b are cross-sectional views showing configuration of a workpiece film for use in the method of the second embodiment shown in FIG. 2;

FIGS. 7a–7g are cross-sectional views showing manufacturing steps of third embodiment of a method of manufacturing a die for optical elements each having a given configuration on a relief type grating according to the present invention;

FIGS. 8a–8f are cross-sectional views showing manufacturing steps of second embodiment of the method of manufacturing a die for optical elements each having a given configuration on a relief type grating according to the present invention;

FIGS. 10a and 10b are cross-sectional views showing configuration of a workpiece film for use in the method of the second embodiment shown in FIG. 8;

FIGS. 11a and 11c are cross-sectional views showing configuration of a workpiece film for use in the method of the second embodiment shown in FIG. 8;

FIGS. 12a–12f are cross-sectional views showing manufacturing steps of conventional example of a method of manufacturing a die for optical elements each having a given configuration on a relief type grating;

FIGS. 13a–13e are cross-sectional views showing manufacturing steps of conventional example of the method of manufacturing a die for optical elements each having a given configuration on a relief type grating.

DETAILED EXPLANATION OF THE PREFERRED EMBODIMENT

Figure 9A:
FIGS. 9a–9c are cross-sectional views showing configuration of a workpiece film for use in the method shown in FIG. 8.

Now to the drawings, there are shown various embodiments of a method of manufacturing a die for optical elements each having a given configuration on a relief type grating according to the present invention and a method of manufacturing an optical element by the die manufacturing method according to the present invention. Like parts are shown by corresponding reference characters throughout several views of the drawings. FIGS. 1a to 1i show a first embodiment of a method of manufacturing a die for optical elements each having a given configuration on a relief type grating according to the present invention. This embodiment applies the present invention to a manufacture of a diffraction lens as a diffraction optical element.

As shown in FIG. 1a, a substrate 1 is provided at its one side surface with a workpiece film 2 having a given thickness t. The value of this thickness t is made larger than a maximum machining depth d in order to prevent a cutting tool 3 from being touched on the substrate 1, even if movement of the cutting tool 3 becomes somewhat fluctuated in machining operation at latter manufacturing steps. Then, the workpiece film 2 is subjected to a machining or cutting operation as shown in FIGS. 1b and 1c, to form recesses having a configuration of given depth distribution as shown in FIG. 1d.

Then, as shown in FIG. 1e, the assembly of the substrate 1 is subjected to an anisotropic etching process by etching gas 5, to transfer the configuration of the workpiece film 2 onto the substrate 1 analogously in the depth direction as shown in FIG. 1f. Thereafter, a die is manufactured by using the thus formed substrate 1 as a master matrix. Finally, a diffraction grating is manufactured by injection molding of plastics with the use of the die thus formed.

Hereinafter, respective manufacturing steps of the method of this embodiment are explained precisely.

At first, the step of providing the workpiece film 2 on the substrate 1 is explained. As the materials of the substrate 1, the material having sufficient rigidity is preferable, since it is secured or mounted to a cutting machine under machining. It is also preferable for this material to have an excellent machinability for etching. Such materials are quartz, synthetic quartz, $SiO_2$ based glass, LiF, $MgF_2$, $BaF_2$, sapphire, KBr, KI or the like.

As a material of workpiece film 2, easy machinable materials such as, for example, resin and easy machinable metal or the like may be used. As an easy machinable metal, for example, Al and P—Ni (electroless nickel) or the like may be used. The workpiece film 2 can be formed with the use of a spin coater or the like in the case of the workpiece film 2 made of resin. In this case, the hardness of the workpiece film 2 can be controlled by selecting baking conditions preferably so as to obtain the hardness suitable to latter manufacturing steps. In the case of workpiece film 2 made of metal, the workpiece 2 can be formed by a vacuum deposition and spattering, or plating and the like.

Next, the step of machining the workpiece film 2 in a configuration having a given depth distribution, for example, in a blazed configuration is explained. In case of manufacturing an optical element having a ring pattern, for example, a diffraction lens, as shown in FIG. 1b, the substrate 1 having the workpiece film 2 provided thereon is loaded on a cutting tool machine, for example, a numeral controlled lathe machine (not shown) as a work. Then, the cutting tool 3 is moved in accordance with design data for lens to be manufactured, while rotating the work, thereby machining the workpiece film 2 in a give configuration.

While in case of manufacturing an optical element having a linear pattern, for example, diffraction type cylindrical lens, with the use of the cutting machine, for example, a numerical controlled milling cutter machine and a ruling engine machine or the like, as shown in FIG. 1c, the workpiece film 2 is cut in a desired configuration by moving the work horizontally and vertically under the condition of the cutting tool 3 being fixed, by moving the cutting tool 3 horizontally and vertically under the condition of the work being fixed.

As described above, by cutting the workpiece film 2, the configuration thereof having desired depth distribution can be obtained easily. Since the recent numerical controlled cutting machine has a cutting precision in the order of sub-micron, so that the desired configuration of the optical element can be obtained with very high precision. Moreover, by alternating the machining data, without limiting the above embodiment, the die configuration corresponding to the optical elements having various configurations, for example, Fresnel lens and the diffraction grating having linear pattern or the like, can be obtained easily. For example, the lathe machine, the milling cutter machine and the ruling engine machine have flexibility, and the same machine cam be utilized for various purposes, so that the cost for manufacture of the optical element can be suppressed.

Now, there will be explained a process in which the thus-formed configuration of the workpiece film 2 is transferred to the substrate 1 by an anisotropic etching, while varying the selection ratio. As the anisotropic etching, such etching that utilizes a reactive gas plasma is preferable from the view points of controllability of selection ratio and anisotropy. Examples of such etching utilizing a reactive gas plasma may include reactive ion etching, plasma etching, reactive ion beam etching, ion beam etching, spatter etching, microwave plasma etching, and the like. In this case, the value of the selection ratio of the etching rate for the workpiece film 2 to the etching rate for the substrate 1 can be changed by adjusting the composition of the etching gas 5. For example, when the above mentioned ratio is set for 1, the pattern configuration of the workpiece 2 is transferred to the substrate at a magnification of one in a depth direction, as it is, and the dimensions of the configuration formed in the substrate 1 is identical with those of the configuration formed in the workpiece 2. However, if the above ratio is set for a ratio other than 1, the configuration of the workpiece film 2 is transferred to the substrate at a magnification not equal to one, so that the depth of the transferred configuration becomes larger or smaller than that of the configuration formed in the workpiece 2. Therefore, by adjusting the composition of etching gas 5, it is possible to control the depth of the configuration formed in the substrate 1.

Next, as shown in FIG. 1g, conductive metal, for example, nickel is deposited on the surface of the substrate 1, on which the configuration of the workpiece film 2 is transmitted analogously in the depth direction as shown in FIG. 1f, by means of the method such as spattering, deposition or the like, thereby forming an electrode member 6. Then, as shown in FIG. 1h, the assembly of the substrate 1 is subjected to an electroforming process to form a nickel electroforming layer 7. Thereafter, as shown in FIG. 1i, the nickel electroforming layer 7 is peeled of from the substrate 1, to form a die, thereby fabricating a diffraction grating by plastic injection molding with the use of the die thus formed. The plastic injection molding by die utilizes the well known method.

As a method of manufacturing the optical element with the use of the die, the above embodiment uses the injection molding, but the present invention is not limited to this, another method, for example, a photo-polymer method (2 P method) may be used. According to this photo-polymer method, ultraviolet curing resin layer (photo-polymer layer) is provided on the transparent substrate, and then, the die is depressed on the ultraviolet curing resin layer, on which ultraviolet lays are illuminated to cure the resin, thereby manufacturing the optical element. This method does not have a temperature cycle, and thus following advantages as compared with the injection molding:

(1) The manufacturing step is short;

(2) Birefringence and comma aberration are hardly caused.

(3) Durability of the die can be made long.

Moreover, the master, of which the substrate material is glass, is formed by the above method, and the die can be formed by the method disclosed in Japanese Patent Application Laid open No. 297,210/89. According to this method, a glass optical element can be manufactured by the press molding.

As is seen from the above description, according to the method of the first embodiment, since machining of the workpiece film 2 is cutting, thereby performing very high precise machining, the configuration formed by this machining is transferred to the substrate by the anisotropic etching, so that a precise master matrix can be manufactured. The electroforming process is performed for this master matrix, but this process can follow the configuration of the master matrix with high fidelity, so that the die can be manufactured with high precision.

Since machining of the workpiece film 2 is cutting, the die can easily be machined in various configurations with the change of machining data, so that the dies of various configurations can easily be manufactured, and thus optical elements having various configurations can easily be manufactured by using these dies.

FIGS. 2a to 2i explain a second embodiment of a method of manufacturing an optical element. In this second embodiment, the method shown in FIG. 1 is applied to the manufacture of the diffraction lens or the like having high diffraction effect.

In case of considering a diffraction lens or the like as a diffraction optical element, the cross-sectional configuration of a grating groove is a blazed configuration reflected by a phase distribution function of the diffraction lens. In this case, generally an inclined side 4 of the grating groove shown in FIG. 3a is a curved line instead of a straight line. Therefore, the ideal configuration to be formed on the workpiece film 2 is, for example, a configuration shown in FIG. 3a. In order to form this configuration by the cutting of the cutting tool, it is necessary to perform a point cutting, for example, a diamond machining, or diamond point turning, but this point cutting requires a great many cutting data so that the time required for cutting or machining becomes long. Then, practically, as shown in FIG. 3b, the machining is performed in such a manner that the cutting data are simplified by making the configuration of the inclined side 4 linear, thereby improving a workability. In this case, if the cross sectional configuration of the grating grooves is made close to a linear line, particularly, when the number of the grooves is small, a problem arises that the effect of the diffraction efficiency on the decrease thereof becomes large.

Moreover, in the spectral grating being a kind of diffraction optical element, also, the optical element is blazed from the necessity of high diffraction efficiency. However, in the blazed diffraction grating for only one wavelength as in the conventional case, it is difficult to cover a wide wavelength range. Then, the blazed diffraction grating for two wavelengths is proposed by and described in "Optics" vol. 12, pp. 201, issued in 1983. This diffraction grating has a configuration having a cross section as shown in FIG. 6b and has effects that wavelength range to be used is made wide and an abnormal of diffracted light strength (anomaly) is decreased. This diffraction grating is manufactured by using two kinds of cutters according to blaze angle, and by performing the cutting two times for one grating groove.

In the case of a blazed diffraction grating for such two wavelengths, it is necessary to perform the cutting two times with the use of the two kinds of cutters, so that the relative positional spacing of the cutters must be controlled with high precision. Moreover, due to two cuttings, long time must be taken in manufacturing. In the case of hard materials of the diffraction grating, also, it takes a long time in the cutting, so that the machining becomes difficult.

As described above, in the case that the cross sectional configuration of the grating grooves is made a configuration without only the linear one, it is difficult to cut the cross sectional configuration of the workpiece film rather than the linear one by the machining in the point of cutting time or the like. This second embodiment is devised by taking this point into consideration.

The detailed explanation of the second embodiment is described with reference to FIGS. 2a to 2i.

Firstly, as shown in FIG. 2a, the substrate 1 is provided, on its one surface, with the workpiece film 2 having a given thickness t. Then, the workpiece film 2 is machined or cut as shown in FIGS. 2b and 2c, thereby forming a configuration having a given depth distribution as shown in FIG. 2d in the workpiece film 2.

Next, as shown in FIG. 2e, the assembly of the substrate 1 is subjected to an anisotropic etching process by an etching gas 5 while changing a selection ratio of an etching rate of a substrate to an etching rate of the workpiece film, to transfer the configuration of the workpiece film 2 to the substrate 1 while changing the configuration of the workpiece 2, thereby obtaining a master matrix having a configuration as shown in FIG. 2f. In this case, as described in the explanation in function of the above first embodiment, when the selection ratio is changed gradually, the configuration of the workpiece 2 is transferred to the substrate 1 as shown in FIG. 2f, thereby obtaining the master matrix of the optical element having required configuration. The required die is formed from this master matrix, and then, the required optical element is manufactured by the plastic injection molding with the use of this die.

Then, respective manufacturing steps of the second embodiment are further described in detail, the explanation of the steps in common with ones of the first embodiment is omitted in part.

Firstly, an explanation will be given on a process in which the workpiece film 2 is machined into a configuration having a predetermined depth distribution, for instance, into a blazed configuration.

When an optical element having a ring-shaped pattern such as a diffraction lens is produced, the substrate 1 provided with the workpiece film 2 is mounted on a numerically controlled lathe machine (not shown) as a work as shown in FIG. 2b. Then, the workpiece film 2 is machined into an ideal configuration by moving the cutting tool 3 in accordance with design data for the aimed diffraction lens while turning the work. In this case, a linear groove cross sectional configuration simplifies the cutting data so that workability of the cutting may be increased.

Now, as shown in FIG. 2e, there will be explained a process in which the thus-formed configuration of the workpiece film 2 is transferred to the substrate 1 by an anisotropic etching, while varying the selection ratio. As the anisotropic etching, such etching that utilizes a reactive gas plasma is preferable from the view points of controllability of selection ratio and anisotropy. Examples of such etching utilizing a reactive gas plasma may include reactive ion etching, plasma etching, reactive ion beam etching, ion beam etching, spatter etching, microwave plasma etching, and the like.

For instance, when a diffraction lens having a function of a convex lens is produced, a substrate 1 provided with a workpiece film 2 having a blazed configuration as shown in FIG. 2b is etched while increasing the selection ratio. In FIGS. 4a–4d, for the purpose of easy understanding of the mechanism, there is illustrated a case where a configuration of the workpiece film 2 having linear blazes is transferred to a substrate as such a configuration that has two bent portions. By varying the selection ratio continuously, the substrate can be etched into such a configuration as shown in FIG. 2f that has smoothly curved blazes.

On the other hand, when a diffraction lens having a function of a concave lens is produced, a substrate 1 provided with a workpiece film 2 having a blazed configuration as shown in FIG. 5a is etched while decreasing the selection ratio. By such an etching, the configuration of the workpiece film 2 is transferred to the substrate 1, thereby producing a die as shown in FIG. 5b.

As described above, by conducting an etching while varying the selection ratio, the blazed configuration of the workpiece film 2 can be transferred to the substrate 1 as such an ideal configuration shown in FIG. 2f or FIG. 5b. Accordingly, a diffraction optical element having a high diffraction efficiency can be easily obtained in this embodiment.

A diffraction grating blazed for two (different) wavelengths as shown in FIG. 6b can be easily produced by utilizing the second embodiment of the present invention. Specifically, a workpiece film 2 is firstly formed into such a blazed configuration as shown in FIG. 6a, and then an etching is conducted with a two-stepped selection ratio. For example, when the etching is conducted with a large selection ratio during the first half of the process, and with a small selection ratio during the second half of the process, the substrate 1 is formed into such a configuration as shown in FIG. 6b. The die may be manufactured by using this configuration as a master matrix of the optical element.

There will be explained methods for varying the selection ratio below.

For instance, in the case of the reactive ion etching, the selection ratio can be varied by changing the composition of gases in the plasma, the discharge power flux density, the pressure of the discharge gas, or the frequency of the applied voltage.

When the composition of gases in the plasma is varied, there occur changes in kinds and proportion of reactants and neutral reactants as well as in energy of ions, and this reads to changes in the reaction on the surface and in the reaction rate. There is also caused a change in the etching mode, which determines whether the etching is substantially a physical one or chemical one. Consequently, the selection ratio of the etching is changed. This is not a phenomenon peculiar to reactive ion etchings, but a common phenomenon seen in any plasma etching. Accordingly, the selection ratio can be varied in the same manner in any other etching method that utilizes plasma.

By varying the composition of gases in the plasma, the selection ratio can be varied rather drastically. Moreover, the flow amount of the gas can be minutely controlled by means of a mass-flow controller or the like, this makes it possible to control the selection ratio minutely.

For instance, when a workpiece film is made of a resist, the workpiece film is removed through oxidation by $O_2$ because the resist is an organic substance. Accordingly, when $O_2$ gas is loaded into the etching gas, the etching rate of the resist is increased, thereby changing the selection ratio. On the other hand, when $H_2$ gas is loaded into the etching gas, a polymer film is formed on the surface of the resist. As a result, the etching rate of the resist is changed, thereby varying the selection ratio. The applicant has confirmed through an experiment, in which the load of $O_2$ gas added into the $CF_4$ gas is varied, that the selection ratio can be varied in reactive ion etching by changing the load of the gas.

In the case where the discharge power flux density is varied, there occur changes in kinds, density and energy of reactants and neutral reactants as well as in energy of ions. Accordingly, the selection ratio can be changed in the same way as the case where the composition of gases in the plasma is varied. This is also not a phenomenon peculiar to reactive ion etchings, but a common phenomenon seen in any plasma etching. Accordingly, the selection ratio can be varied in the same manner in any other etching method that utilizes plasma. Since the selection ratio can be varied subtly by changing the discharge power flux density, this method is particularly effective when a subtle change in the selection ratio is desired.

Moreover, the selection ratio may also be changed by changing the discharge power flux density in the reactive ion etching. This was confirmed in the experiment by the present inventor. When the pressure of the discharge gas or the frequency of the applied voltage is varied, the energy of ions and average energy of electrons are correspondingly varied, thereby changing the selection ratio. This is such a phenomenon that is common to etchings utilizing ion-assisted reactions. Therefore, with this technique, the selection ratio can be varied not only in reactive ion etchings, but also in plasma etchings, reactive ion beam etchings, microwave plasma etchings, ion beam millings and the like.

By varying the pressure of the discharge gas or the frequency of the applied voltage, the selection ratio can be changed in etchings utilizing ion-assisted reactions. As an etching gas, fluorine based gases such as $CF_4$ gas and $CHF_3$ gas can be used in the case where it is intended to etch a quarts glass used in the visible range or ultraviolet range. In the case of Si to be used in the infrared range, a fluorine based gas such as $CF_4$ gas, $SF_6$ gas and $NF_3$ gas or a chlorine based gas such as $Cl_2$ gas and $CCl_2$ gas can be used as the etching gas.

By the above-mentioned methods, the selection ratio of etching can be varied easily. In particular, by controlling the composition of gases in the plasma and discharge power flux density, the selection ratio can be varied over a rather wide range with a high precision.

After the manufacture of the master matrix, the die is manufactured by the same method as that shown in the first embodiment as shown in FIGS. 2g to 2i. The required optical element may be manufactured by for example injection molding, compression molding, 2 P method or the like with the use of this die.

As is seen from the above explanation, since the workpiece film 2 formed on the substrate 1 is machined first, and the thus-machined configuration is subjected to an anisotropic etching, while varying the selection ratio according to the second embodiment, a modified configuration of the workpiece film 2 is transferred to the substrate 1.

Accordingly, even in a production of a diffraction lends having an ideal configuration corresponding to the phase distribution or a production of a Fresnel lens, the workpiece film 2 can be machined into such a configuration that has linear blazes. Consequently, the amount of cutting data and cutting time required for the machining can be greatly suppressed.

Moreover, in the case where a diffraction grating blazed for two (different) wavelengths is produced, the blazes of the grooves can be made linear, thereby greatly suppressing the amount of cutting data and cutting time during the machining. Since the machining can be completed in a single step using a single cutting tool, processes for exchange of cutting tools and subsequent positioning are no longer required, thereby enabling a mass production without difficulty.

Further preferred embodiments of the present invention will be described in detail with reference to the attached drawings. FIGS. 7a–7g are given to illustrate a third embodiment of the present invention. In this embodiment, the method of the present invention is applied to the production of a diffraction optical element, namely a diffraction lens. Incidentally, for the purpose of simplifying the explanation, there are some partial exaggerations and omissions in these figures as well as in other drawings attached hereto to the extent that they do not affect the scope of the present invention.

First of all, as shown in FIG. 7a, a workpiece film 2 made of Al which is easily worked by a cutting machine is formed on a surface of a substrate 1 of $Cr_2O_3$ (chromium oxide) in a predetermined thickness of "t". Vacuum deposition, sputtering, plating and the like are applicable as a method for forming the workpiece film 2 on the substrate 1. In this connection, the thickness "t" should be set larger than the maximum machining depth "d" so that a cutting tool 3 does not come into contact with the substrate 1 even if there are some errors in the movement of the cutting tool 3 during the machining in a later process.

Next, there will be given an explanation on a process in which the workpiece film 2 is machined into a shape having a predetermined depth distribution such as a blazed configuration. As seen in FIG. 7b, the substrate 1 provided with the workpiece film 2 is mounted on a cutting machine, for example, on a numerically controlled lathe machine (not shown) as a work. Then, the workpiece film 2 is machined into a desired configuration by moving the cutting tool 3 in accordance with design data for a diffraction lens to be produced while turning the work.

When it is intended to produce an optical element having a linear pattern such as a diffraction-type cylindrical lens, the workpiece film 2 is formed into a desired shape as shown in FIG. 7d, by moving the work in up-and-down direction as well as right-and-left direction while fixing the cutting tool 3 or by moving the cutting tool 3 in such directions while fixing the work as seen in FIG. 7c with use of a cutting machine such as a numerically controlled milling (cutter) machine, ruling engine machine or the like. In this connection, the shape formed on the workpiece film 2 is the reverse of the diffraction surface of the aimed diffraction lens.

Then, as shown in FIG. 7e, an anisotropic etching, for instance, an argon ion etching is conducted with use of an etching gas 5, thereby similarly transferring the configuration of the workpiece film 2 to the substrate 1 in the depth-wise direction. Accordingly, there can be formed a die for diffraction lenses comprising the substrate 1 having such a configuration as shown in FIG. 7f.

The argon ion etching is such an etching method in which argon ions accelerated by the application of a high voltage collide with a surface of a material and flick atoms out of the material, thereby etching the surface. Accordingly, this etching is mainly conducted by a physical action, and thus has the following features.

(1) Material selectivity of etching rate is small when compared with that in a chemical etching and therefore, materials having a rather high chemical resistance such as platinum, rhodium and the like can be etched by this method.

(2) It essentially has a high anisotropy, which leads to a high machining precision.

When a selection ratio is 1, the exact pattern of the workpiece film 2 is transferred to the substrate. When the selection ratio is not 1, respective depths of the pattern formed on the workpiece film 2 may be determined in accordance with the selection ratio.

While using the thus-etched substrate 1 as a part of a die, a diffraction lens is produced from a glass. An upper die 6 shown in FIG. 7g is the substrate 1 and a lower die 7 is a WC-based (tungsten carbide-based) column having mirror-polished upper and lower surfaces. The upper surface of the lower die 7 is coated with platinum to prevent fusing between the glass and the die. On the upper surface of the lower die 7 is mounted an optical glass 8 which has been roughly shaped into the configuration of the aimed diffraction lens. After heating the optical glass 8 to a softening point or higher, the optical glass 8 is press-molded, thereby obtaining the aimed glass-made diffraction lens.

In addition to the above-explained press molding method, examples of the producing method for optical elements in which the die of the present embodiment is used may include an injection molding method for plastics, photo-polymerization process (2P process) utilizing ultraviolet curing resins and the like. Any one of them is generally known as a producing method which utilizes a die.

Here, the photo-polymerization process is briefly explained. In this process, a ultraviolet curing resin (photo-polymer) layer is firstly formed on a transparent substrate. Then, the resin is cured by applying ultraviolet rays thereto while holding the die to this resin layer. When compared with the injection molding, this photo-polymerization process is advantageous in such aspects that (1) the total production procedure is short; (2) there hardly occur a birefringence or comma aberration; and (3) the die can have a longer service life, because this process is free from a temperature cycle.

As is clear from the above explanation, according to the first embodiment of the present invention, a die is produced by machining the easily machinable workpiece film first, and then etching the substrate. Therefore, those materials that cannot be machined into a fine configuration with a high precision, for example, materials for a die used to mold glasses (namely, WC, SiC and the like) can be precisely formed into a diffraction grating pattern in the present embodiment. In other words, according to the present invention, a glass-made diffraction lens and a press-molding die for such a diffraction lens can be produced by a very simple procedure when compared with the conventional production method.

Furthermore, since it is an easily machinable workpiece film 2 that is worked by machining, a configuration having a desired depth distribution can be easily obtained in the present embodiment. In addition, owing to the recent numerically controlled cutting machines having a working precision of sub-micron order, there can be obtained a desired configuration with a extremely high precision. Since this configuration of the workpiece film 2 is transferred to the substrate by an anisotropic etching, there can be produced a precise die in the present embodiment. Various configurations of optical elements corresponding to those other than the above-described diffraction lens, e.g. a Fresnel lens, diffraction grating with a linear pattern or the like, can be easily obtained by varying the working data for the cutting machine. Moreover, since cutting machines such as the lathe machine, milling cutter machine and ruling engine machine are general-purpose ones and thus can be used for the other various purposes, the cost for producing the optical element can be suppressed correspondingly.

Although Al has been mentioned as a material for the workpiece film 2, the present invention is not restricted to this material and other easily machinable materials such as resins and easily machinable metals can also be used in the present invention. In addition to the aforementioned $Cr_2O_3$, WC (tungsten carbide), SiC (silicon carbide) and the like can be used as a material for the substrate 1. However, in the case where WC or SiC is used as the material, it is desirable to coat the substrate with platinum, TiN, or the like to prevent the fusing between the glass and the die.

The method of the present embodiment can be applied not only to the production of the diffraction lens but also to the production of more general diffraction grating or a Fresnel lens.

FIGS. 8a to 8f explain a fourth embodiment of a method of manufacturing an optical element. In this fourth embodiment, the method shown in FIGS. 7a–7g is applied to the manufacture of the diffraction lens or the like having high diffraction effect.

Figure 9B:
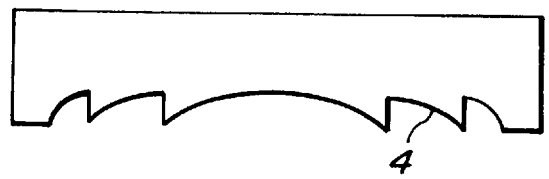
Figure 9C:
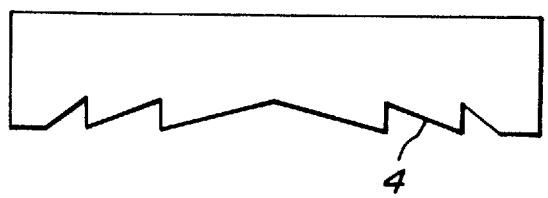

In case of considering diffraction lens or the like as a diffraction optical element, the cross-sectional configuration of grating groove is a blazed configuration reflected by a phase distribution function of the diffraction lens. In this case, generally an inclined side 4 of the grating groove shown in FIG. 3a is a curved line instead of a straight line. Therefore, ideal configuration to be formed on the workpiece film 2 is, for example, a configuration shown in FIG. 9a. In order to form this configuration by the cutting of the cutting tool, it is necessary to perform a point cutting, for example, a diamond machining, or diamond point turning, but this point cutting requires a great many cutting data so that the time required to cutting or machining becomes long. Then, practically, as shown in FIG. 9b, the machining is performed in such a manner that the cutting data are simplified by making the configuration of the inclined side linear. In this case, if the number of the grooved is made large, the effect on the diffraction efficiency can be ignored, but if the cross sectional configuration of the grating grooves is made close to a linear line, particularly, when the number of the grooves is small, a problem arises that the effect of the diffraction efficiency on the decrease thereof becomes large.

Moreover, in the spectral grating being a kind of diffraction optical element, also, the optical element is blazed from the necessity of high diffraction efficiency. However, in the blazed diffraction grating for only one wavelength as in the conventional case, it is difficult to cover a wide wavelength range. Then, the blazed diffraction grating for two wavelengths is proposed by and described in "Optics" vol. 12, pp. 201, issued in 1983. This diffraction grating has a configuration having a cross section as shown in FIG. 11a and has effects that wavelength range to be used is made wide and an abnormality of diffracted light strength (anomaly) is decreased. This diffraction grating is manufactured by using two kinds of cutters according to blaze angle, and by performing the cutting two times for one grating groove.

In the case of a blazed diffraction grating for such two wavelengths, it is necessary to perform the cutting two times with the use of the two kinds of cutters, so that the relative positional spacing of the cutters must be controlled with high precision. Moreover, due to two cuttings, long time must be taken in manufacturing.

As described above, in the case that the cross sectional configuration of the grating grooves is made a configuration without only the linear one, it is difficult to cut the cross sectional configuration of the workpiece film rather than the linear one by the machining in the point of cutting time or the like. This embodiment is devised by taking this point into consideration.

The fourth embodiment of the present invention will be described with reference to FIGS. 8a–8f.

First of all, as shown in FIG. 8a, on one surface of a substrate 1 made of Ni (nickel) is formed a workpiece film 2 of a resin such as resist in a predetermined thickness of "t". When the workpiece film 2 is made of a resin, the formation of the workpiece film can be conducted by using a spin coater or the like. In this case, the workpiece film 2 can be produced to have a hardness suitable to later processes by appropriately determining the baking conditions.

Next, an explanation will be given on a process in which the workpiece film 2 is machined into a configuration having a predetermined depth distribution, for instance, into a blazed configuration.

When an optical element having a ring-shaped pattern such as a diffraction lens is produced, the substrate 1 provided with the workpiece film 2 is mounted on a numerically controlled lathe machine (not shown) as a work as shown in FIG. 8b. Then, the workpiece film 2 is machined into a desired configuration by moving the cutting tool 3 in accordance with design data for the aimed diffraction lens while turning the work. As a result, the cross-section of each groove has a linear configuration.

Now, there will be explained a process in which the thus-formed configuration of the workpiece film 2 is transferred to the substrate 1 by an anisotropic etching, while varying the selection ratio. As the anisotropic etching, such etching that utilizes a reactive gas plasma is preferable from the view points of controllability of selection ratio and anisotropy. Examples of such etching utilizing a reactive gas plasma may include reactive ion etching, plasma etching, reactive ion beam etching, ion beam etching, spatter etching, microwave plasma etching, and the like.

As shown in FIG. 8e, an etching is conducted with use of an etching gas 5, while varying the selection ratio of etching between the substrate 1 and the workpiece film 2. For instance, when a die for a diffraction lens having a function of a convex lens (in this case the die itself should have a concave) is produced, a substrate 1 provided with a workpiece film 2 having a blazed configuration as shown in FIG. 8d is etched while increasing the selection ratio. In FIGS. 4a–4d, for the purpose of easy understanding of the mechanism, there is illustrated a case where a configuration of the workpiece film 2 having linear blazes is transferred to a substrate as such a configuration that has two bent portions. By varying the selection ratio continuously, the substrate can be etched into such a configuration as shown in FIG. 8f that has smoothly curved blazes.

On the other hand, when a die for a diffraction lens having a function of a concave lens is produced, a substrate 1 provided with a workpiece film 2 having a blazed configuration as shown in FIG. 10a is etched while decreasing the selection ratio. By such an etching, the configuration of the workpiece film 2 is transferred to the substrate 1, thereby producing a die as shown in FIG. 10b.

As described above, by conducting an etching while varying the selection ratio, the blazed configuration of the workpiece film 2 can be transferred to the substrate 1 as such an ideal configuration shown in FIG. 8f or FIG. 10b. Accordingly, a diffraction optical element having a high diffraction efficiency can be easily obtained in this embodiment.

A diffraction grating blazed for two (different) wavelengths as shown in FIG. 11a or 11c can be easily produced by utilizing the fourth embodiment of the present invention. Specifically, a workpiece film 2 is firstly formed into such a blazed configuration as shown in FIG. 11b, and then an etching is conducted with a two-stepped selection ratio. For example, when the etching is conducted with a large selection ratio during the first half of the process, and with a small selection ratio during the second half of the process, the substrate 1 is formed into such a configuration as shown in FIG. 11c. An optical element can be produced using this substrate as a part of a molding die.

There will be explained methods for varying the selection ratio below.

For instance, in the case of the reactive ion etching, the selection ratio can be varied by changing the composition of gases in the plasma, the discharge power flux density, the pressure of the discharge gas, or the frequency of the applied voltage.

When the composition of gases in the plasma is varied, there occur changes in kinds and proportion of reactants and neutral reactants as well as in energy of ions, and this reads to changes in the reaction on the surface and in the reaction rate. There is also caused a change in the etching mode, which determines whether the etching is substantially physical one or chemical one. Consequently, the selection ratio of the etching is changed. This is not a phenomenon peculiar to reactive ion etchings, but a common phenomenon seen in any plasma etching. Accordingly, the selection ratio can be varied in the same manner in any other etching method that utilizes plasma.

By varying the composition of gases in the plasma, the selection ratio can be varied rather drastically. Moreover, the flow amount of the gas can be minutely controlled by means of a mass-flow controller or the like, this makes it possible to control the selection ratio minutely.

For instance, when a workpiece film is made of a resist, the workpiece film is removed through oxidation by $O_2$ because the resist is an organic substance. Accordingly, when $O_2$ gas is loaded into the etching gas, the etching rate of the resist is increased, thereby changing the selection ratio. On the other hand, when $H_2$ gas is loaded into the etching gas, a polymer film is formed on the surface of the resist. As a result, the etching rate of the resist is changed, thereby varying the selection ratio. The applicant has confirmed through an experiment, in which the load of $O_2$ gas added into the $CF_4$ gas is varied, that the selection ratio can be varied in reactive ion etching by changing the load of the gas.

In the case where the discharge power flux density is varied, there occur changes in kinds, density and energy of reactants and neutral reactants as well as in energy of ions. Accordingly, the selection ratio can be changed in the same way as the case where the composition of gases in the plasma is varied. This is also not a phenomenon peculiar to reactive ion etchings, but a common phenomenon seen in any plasma etching. Accordingly, the selection ratio can be varied in the same manner in any other etching method that utilizes plasma. Since the selection ratio can be varied subtly by changing the discharge power flux density, this method is particularly effective when a subtle change in the selection ratio is desired.

When the pressure of the discharge gas or the frequency of the applied voltage is varied, the energy of ions and average energy of electrons are correspondingly varied, thereby changing the selection ratio. This is such a phenomenon that is common to etchings utilizing ion-assisted reactions. Therefore, with this technique, the selection ratio cab be varied not only in reactive ion etchings, but also in plasma etchings, reactive ion beam etchings, microwave plasma etchings, ion beam etchings and the like.

By varying the pressure of the discharge gas or the frequency of the applied voltage, the selection ratio can be changed in etchings utilizing ion-assisted reactions. As an etching gas, fluorine based gases such as $CF_4$ gas and $CHF_3$ gas can be used in the case where it is intended to etch a quarts glass used in the visible range or ultraviolet range. In the case of Si to be used in the infrared range, a fluorine based gas such as $CF_4$ gas, $SF_6$ gas and $NF_3$ gas or a chlorine based gas such as $Cl_2$ gas and $CCl_2$ gas can be used as the etching gas.

By the above-mentioned methods, the selection ratio of etching can be varied easily. In particular, by controlling the composition of gases in the plasma and discharge power flux density, the selection ratio can be varied over a rather wide range with a high precision.

Examples of a method for producing an optical element, wherein the thus-obtained substrate 1 is used as a part of a mold, may include those methods which have been already mentioned with reference to the first embodiment, namely a press molding for glass, injection molding for plastics, photo-polymerization method and the like.

As is clear from the above explanation, since the workpiece film 2 formed on the substrate 1 is machined first, and the thus-machined configuration is subjected to an anisotropic etching, while varying the selection ratio according to the second embodiment, a modified configuration of the workpiece film 2 is transferred to the substrate 1. Accordingly, even in a production of a diffraction lends having an ideal configuration corresponding to the phase distribution or a production of a Fresnel lens, the workpiece film 2 can be machined into such a configuration that has linear blazes. Consequently, the amount of cutting data and cutting time required for the machining can be greatly suppressed.

Moreover, in the case where a diffraction grating blazed for two (different) wavelengths is produced, the blazes of the grooves can be made linear, thereby greatly suppressing the amount of cutting data and cutting time during the machining. Since the machining can be completed in a single step using a single cutting tool, processes for exchange of cutting tools and subsequent positioning are no longer required, thereby enabling a mass production without difficulty.

What is claimed is:

1. A method of manufacturing a die for optical elements, said method comprising:
    (a) forming a workpiece film on a substrate;
    (b) mechanically machining the workpiece film in a required configuration;
    (c) subjecting the workpiece film mechanically machined in the required configuration and the substrate to etching to transfer the required configuration of the workpiece film onto the substrate analogously in a depth direction; and
    (d) forming a die by using the substrate etched in step (c) as a master matrix.

2. A method of manufacturing a die for optical elements, said method comprising:
    (a) forming a workpiece film on a substrate;
    (b) mechanically machining the workpiece film in a required configuration;
    (c) subjecting the workpiece film mechanically machined in the required configuration and the substrate to etching while changing a selection ratio of an etching rate of the substrate to an etching rate of the workpiece film; and
    (d) forming a die by using the substrate etched in step (c) as a master matrix.

3. The method of manufacturing a die for optical elements as claimed in claim 2, wherein said etching is an anisotropic etching using a reactive gas plasma, and the step of changing the selection ratio uses at least one of the following operations:
    changing a gas composition in the plasma;
    changing a discharge power flux density;
    changing a pressure of discharge gas; and
    changing a frequency of applied voltage.

4. The method of manufacturing a die for optical elements as claimed in claim 1, wherein step (d) of forming the die comprises:
    (i) forming an electrode member of conductive metal on the substrate;

(ii) forming an electroformed layer by performing an electroforming process using the electrode member as an electrode; and (iii) removing the electroformed layer from the substrate.

5. A method of manufacturing optical elements, said method comprising:

(a) forming a workpiece film on a substrate;

(b) mechanically machining the workpiece film in a required configuration;

(c) subjecting the workpiece film mechanically machined in the required configuration and the substrate to etching to transfer the required configuration of the workpiece film onto the substrate analogously in a depth direction;

(d) forming a die by using the substrate etched in step (c) as a master matrix; and (e) fabricating the optical elements by use of the die formed in step (d).

6. A method of manufacturing optical elements, said method comprising:

(a) forming a workpiece film on a substrate;

(b) mechanically machining the workpiece film in a required configuration;

(c) subjecting the workpiece film mechanically machined in the required configuration and the substrate to etching while changing a selection ratio of an etching rate of the substrate to an etching rate of the workpiece film;

(d) forming a die by using the substrate etched in step (c) as a master matrix; and (e) fabricating the optical elements by use of the die formed in step (d).

7. The method of manufacturing optical elements as claimed in claim 6, wherein said etching is an anisotropic etching using a reactive gas plasma, and the step of changing the selection ratio uses at least one of the following operations:

changing a gas composition in the plasma;

changing a discharge power flux density; and changing a pressure of discharge gas; and changing a frequency of applied voltage.

8. The method of manufacturing optical elements as claimed in claim 5, wherein step X1 of forming the die comprises:

(i) forming an electrode member of conductive metal on the substrate;

(ii) forming an electroformed layer by performing an electroforming process using the electrode member as an electrode; and (iii) removing the electroformed layer from the substrate.

9. A method of manufacturing a die for optical elements, said method comprising:

(a forming a workpiece film on a substrate;

(b) mechanically machining the workpiece film in a required configuration;

(c) subjecting the workpiece film mechanically machined in the required configuration and the substrate to etching to transfer the required configuration of the workpiece film onto the substrate analogously in a depth direction; and (d) forming a die by using the substrate etched in step (c) as a part of the die.

10. A method of manufacturing a die for optical elements, said method comprising:

(a) forming a workpiece film on a substrate;

(b) mechanically machining the workpiece film in a required configuration;

(c) subjecting the workpiece film mechanically machined in the required configuration and the substrate to an anisotropic etching while changing a selection ratio of an etching rate of the substrate to an etching rate of the workpiece film; and (d) forming a die by using the substrate etched in step (d) as a part of the die.

11. The method of manufacturing a die for optical elements as claimed in claim 10, wherein the etching is an etching using a reactive gas plasma, and the step of changing the selection ratio uses at least one of the following operations:

changing a gas composition in the plasma;

changing a discharge power flux density;

changing a pressure of discharge gas; and changing a frequency of applied voltage.

12. A method of manufacturing optical elements, said method comprising:

(a) forming a workpiece film on a substrate;

(b) mechanically machining the workpiece film in a required configuration;

(c) subjecting the workpiece film mechanically machined in the required configuration and the substrate to an etching process to replicate the required configuration of the workpiece film on the substrate analogously in a depth direction; and (d) fabricating the optical elements by use of the substrate etched in step (c) as a part of a die.

13. A method of manufacturing optical elements, said method comprising:

(a) forming a workpiece film on a substrate;

(b) mechanically machining the workpiece film in a required configuration;

(c) subjecting the workpiece film mechanically machined in the required configuration and the substrate to etching while changing a selection ratio of an etching rate of the substrate to an etching rate of the workpiece film; and (d) fabricating the optical elements by use of the substrate etched in step (c) as a part of a die.

14. The method of manufacturing optical elements as claimed in claim 13, wherein the etching is an etching using reactive gas plasma, and the step of changing the selection ratio uses at least one of the following operations:

changing a gas composition in the plasma;

changing a discharge power flux density;

changing a pressure of discharge gas; and changing a frequency of applied voltage.

15. The method of manufacturing a die for optical elements as claimed in claim 2, wherein step (d) of forming the die comprises:

(i) forming an electrode member of conductive metal on the substrate;

(ii) forming an electroformed layer by performing an electroforming process using the electrode member as an electrode; and (iii) removing the electroformed layer from the substrate.

16. The method of manufacturing optical elements as claimed in claim 6, wherein step (d) of forming the die comprises:

(i) forming an electrode member of conductive metal on the substrate;

(ii) forming an electroformed layer by performing an electroforming process using the electrode member as an electrode; and (iii) removing the electroformed layer from the substrate.

17. The method of manufacturing a die for optical elements as claimed in 1, wherein step (c) is performed while changing a selection ratio of an etching rate of the substrate to an etching rate of the workpiece film.

18. The method of manufacturing optical elements as claimed in claim 5, wherein step (c) is performed while changing a selection ratio of an etching rate of the substrate to an etching rate of the workpiece film.

19. The method of manufacturing a die for optical elements as claimed in claim 9, wherein step (c) is performed while changing a selection ratio of an etching rate of the substrate to an etching rate of the workpiece film.

20. The method of manufacturing optical elements as claimed in claim 12, wherein step (c) is performed while changing a selection ratio of an etching rate of the substrate to an etching rate of the workpiece film.

* * * * *